Nov. 1, 1949.  H. C. GRAVES, JR  2,486,594
SELECTIVE TRIP MECHANISM FOR CIRCUIT BREAKERS
Original Filed Feb. 17, 1944  4 Sheets-Sheet 2
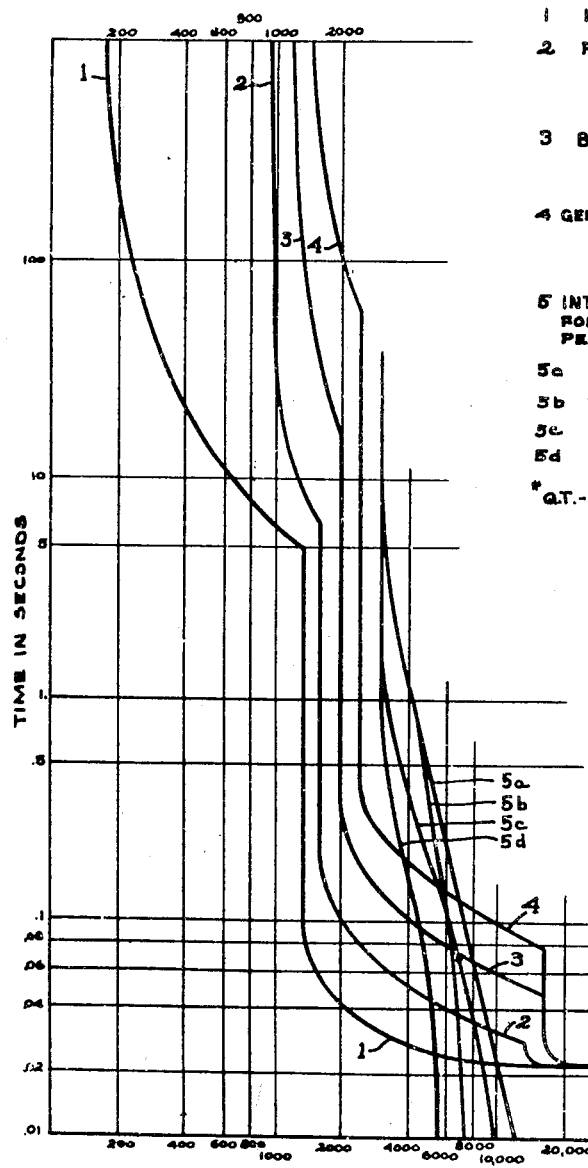
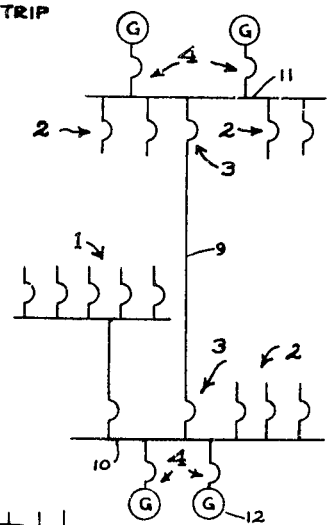
Fig. 2
INVENTOR.
Herbert C. Graves, Jr.
BY
Ostrolenk and Faber
ATTORNEYS Nov. 1, 1949.  H. C. GRAVES, JR  2,486,594
SELECTIVE TRIP MECHANISM FOR CIRCUIT BREAKERS
Original Filed Feb. 17, 1944  4 Sheets-Sheet 3
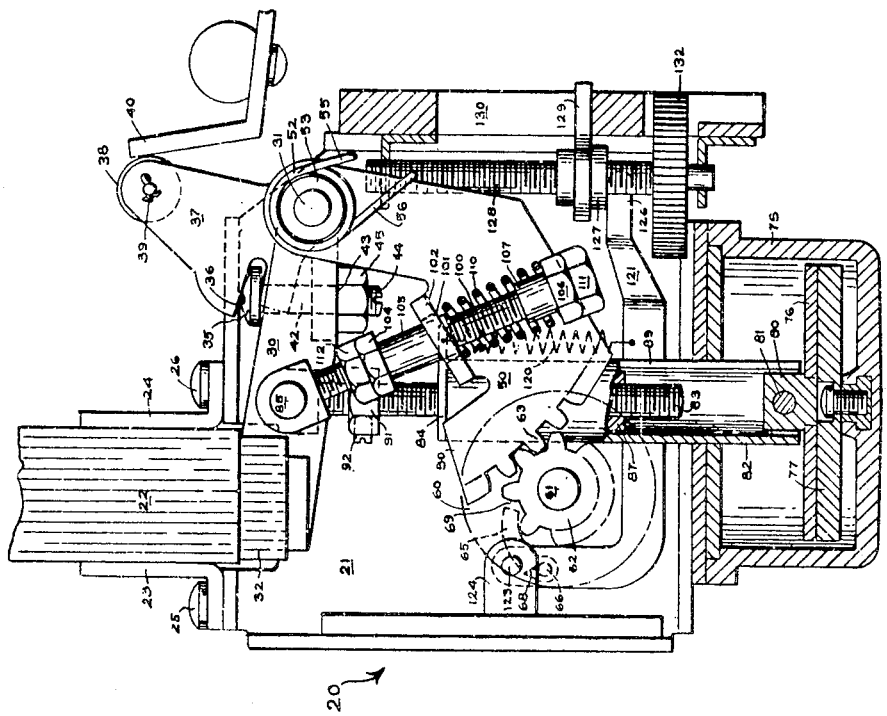
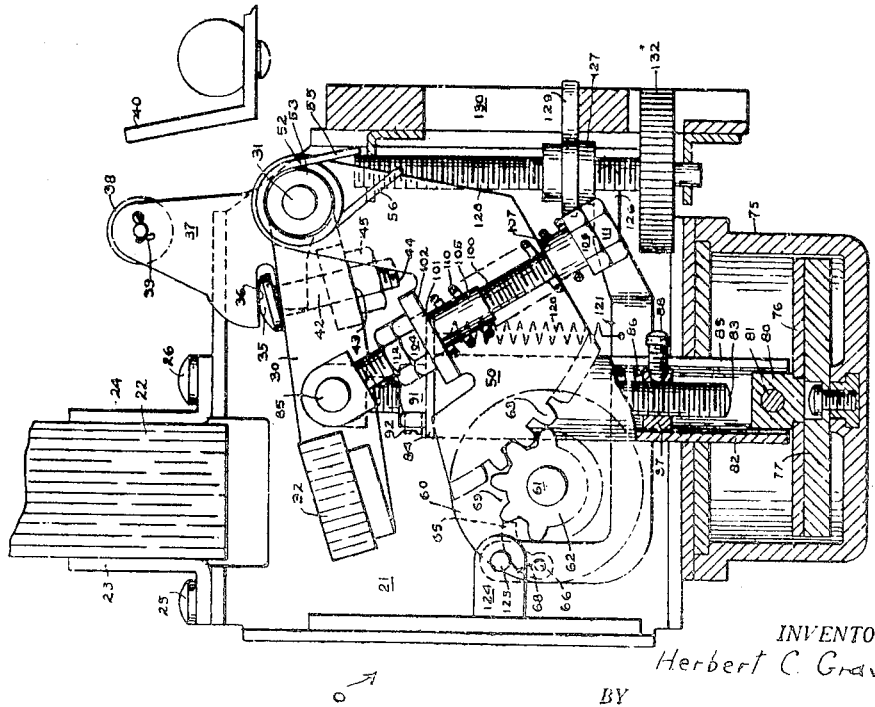
INVENTOR.
Herbert C. Graves, Jr.
BY
Ostrolenk and Faber
Attorneys.

Nov. 1, 1949.  H. C. GRAVES, JR  2,486,594
SELECTIVE TRIP MECHANISM FOR CIRCUIT BREAKERS
Original Filed Feb. 17, 1944  4 Sheets-Sheet 4

INVENTOR.
Herbert C. Graves, Jr.
BY
Ostrolenk and Faber
Attorneys.

Patented Nov. 1, 1949

2,486,594

UNITED STATES PATENT OFFICE 2,486,594

SELECTIVE TRIP MECHANISM FOR CIRCUIT BREAKERS

Herbert C. Graves, Jr., West Chester, Pa., assignor to I-T-E Circuit Breaker Company, Philadelphia, Pa., a corporation of Pennsylvania Original application February 17, 1944, Serial No. 522,725, now Patent No. 2,439,165, dated April 6, 1948. Divided and this application May 23, 1945, Serial No. 595,455

10 Claims. (Cl. 175—372)

This application is a division of Patent Number 2,439,165 issued April 6, 1948, and a continuation-in-part of my application, Ser. No. 488,841 filed May 28, 1943.

My invention relates to a novel system of circuit breakers arranged for sequential tripping over the entire protective tripping range of the circuit breakers including the short circuit current ranges, and more particularly relates to novel circuit breaker apparatus provided with direct acting overload devices which may be adjusted to secure sequential tripping with respect to other breakers in the system.

In distribution systems within, for instance, a large industrial plant, the power enters the plant through a main circuit breaker to the main distribut on switchboard and is there fed out on a number of feeder circuits each protected by a circuit breaker. These feeders may each go to large loads. Some, or all, however, may go to additional distribution switchboards where they are again divided into smaller distribution circuits. Each of these circuits may in turn go to load centers or power panels for distribution of the energy to a multiplicity of loads.

Distribution systems of this type (of which a simplified diagrammatic illustration is hereinafter shown in the figures) are utilized not only in most industrial plants, but also wherever a large quantity of apparatus in a relatively compact unit must be operated from a central power source.

In such distribution systems, the fault or short circuit conditions in one of the feeder circuits, or even in one of the load circuits, passes through several breakers in series and may result not merely in a tripping of the circuit breaker protecting that particular load, but in a tripping of each of the circuit breakers back of and in series with that particular circuit breaker back to the source, so that one of the main feeder breakers, or even the main breaker itself, may be tripped and thus disconnect the entire distribution system.

Accordingly, the primary problem to which this invention is directed is the construction and arrangement of such circuit breakers in a distribution system in such a novel manner that high speed selective tripping will occur, and so that the circuit breaker nearest the fault will be operative to clear an overcurrent, fault, or short circuit condition on the particular circuit it is protecting before the circuit breakers between it and the source can complete a tripping operation, and so that each circuit breaker in the system will be protected by the circuit breaker immediately behind it toward the source.

In order to secure the sequential tripping at short circuit current values where extremely fast operations are necessary, I have discovered that I may, by the use of time delay mechanism such as inertia members in the overload devices, effect close timing between the overload devices of successive circuit breakers at short circuit values of current. This is due to the fact that the operation of the tripping mechanism of the circuit breaker is effected by a direct acting overload coil and that the inertia or other time delay devices are accurate for very short timing periods.

In one form of my invention there is interposed between the armature and the tripping mechanism of the circuit breaker an inertia mass which provides the inverse time delay in the movement of the armature towards the tripping mechanism. When however one of the circuit breakers having a slightly faster operation engages the tripping mechanism and the circuit breaker thereupon effects an opening of the system (each having been delayed by the mass in the manner herein described, for slightly longer periods) will not yet have reached the tripping position; and since the clearance of the fault by one circuit breaker will reduce the magnetic attraction exerted by one overcurrent magnet on the armature to the full load level or less, and since the armature is normally restrained by a spring having a somewhat greater force than that exerted by the magnet at full load even at the reduced air gap, the armature will return without reaching the trip position.

Although the masses in the overload devices of each of these other circuit breakers will, through their inertia, continue to move forward, the energy stores in these masses is ineffective to perform any further action on the tripping mechanism since actual tripping is, as stated above, effected by direct action of the armature on the tripping mechanism and the armatures being of exceedingly light weight and being held back by comparatively powerful springs have been restored, as stated above, immediately upon the opening of the circuit by the next lowest breaker.

In other words, by a reliance on the use of a very light armature restrained by a comparatively powerful spring, there is at no time any substantial kinetic energy stored in the armature in its movement in response to the overload magnet.

Accordingly, a further object of my invention is to provide novel direct operating overload apparatus in circuit breakers to secure a novel sequential tripping system.

Still a further object of my invention is to provide restraining or time delay mechanism on the quick trip armature of the overcurrent trip magnet.

These objects will become apparent from the following description and drawings in which:

Figure 2 is a schematic diagram of another typical distribution system where, in addition to the problem of the selective tripping of feeder breakers, there are presented the problems which arise from the utilization of two sources of power together with bus tie breakers; this figure also includes a graph showing the tripping characteristics of the breakers in the system.

Figure 3 is a side view showing the construction and operation of a time delay device for a typical circuit breaker in the distribution systems of Figures 1 and 2; the view of Figure 3 shows the relationship of all of the parts in the de-energized position of the circuit breaker tripping armature.

Figure 6 is a view corresponding to that of Figure 3 showing the position of the elements thereof, however, when there is an extremely heavy short circuit and no delay at all is desired.

Figure 1:
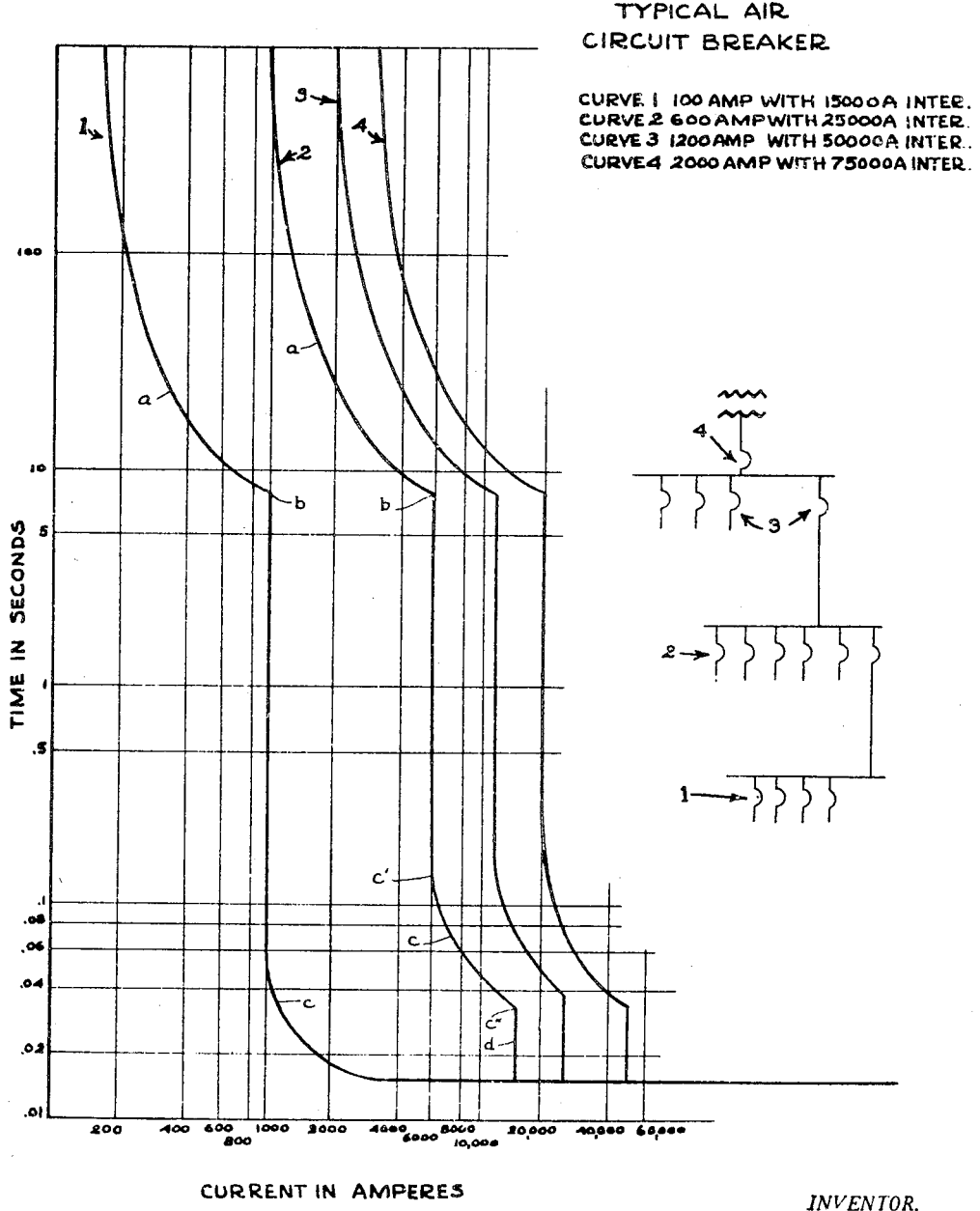
Figure 1 is a schematic diagram of a group of circuit breakers in a typical distribution system together with a graph showing the tripping characteristics of each of the circuit breakers in the group.

Referring now to Figure 1, I have here shown a typical distribution system having a plurality of circuit breakers together with a graph showing the tripping characteristics thereof. In this distribution system, the electrical energy is distributed at a utilization voltage of 440 volts, the various interrupting capacities for each of the breakers are shown in the curves.

The power enters the main plant by the circuit breaker 4, and then passes to a main distribution switchboard whence it is fed out on a number of feeder breakers 3. These feeders may each go to large loads. Some, or all, however, may go to additional distribution switchboards where they are again divided into a plurality of small distribution circuits to which energy is fed out over the circuit breakers 2. Each of these circuits may in turn go to load centers or power panels for distribution of the energy over the circuit breakers 1 to a multiplicity of loads.

The graph of Figure 1 illustrates the characteristic curves of the circuit breakers in the distribution system of Figure 1. Each of the circuit breakers in the distribution system has similar characteristics of operation, and a specific description of one of the curves for one of the circuit breakers should suffice to illustrate the operation of the remainder.

Thus considering curve 2 for circuit breaker 2, which is a 600 ampere circuit breaker with a maximum interrupting capacity of 25,000 amperes, the upper part of the curve $a$ is the inverse time characteristic of the overload device. It is set at a high value to take care of starting motors directly across the line and other large surges frequently encountered in present day installations.

At ten times normal current or 6000 amperes at point $b$, the quick trip feature comes into play. This quick trip also has an inverse time feature, but the time delay value is very small, being of the order of one to six cycles of a 60 cycle wave. As shown, however, at portions $c$ and $d$ of curve 2, even this small time delay is defeated, and breaker 2 will open immediately at the value of the interrupting capacity (15,000 amperes) of the next smaller breaker (circuit breaker 1) to protect this next smaller breaker. (For safety, this instantaneous trip may be 80% of 15,000 or 12,000 amperes.)

This illustration of the operation of circuit breaker 2 in connection with curve 2 illustrates a main principle underlying the present invention —that is, that each circuit breaker is ordinarily arranged to open the circuit which it protects before the circuit breakers of greater capacity back of it in series come into operation. Where however the capacity of the circuit breaker nearest the fault is exceeded, the next circuit breaker of greater capacity back of it in series will come into operation, and so on, until a circuit breaker is reached which can clear the load.

Each circuit breaker is given time delay characteristics which enable it to come into operation at the appropriate times, in order to protect the circuits as well as the circuit breakers which follow it in series.

In each circuit breaker a quick trip operation may be provided in addition to the overload time delay, which has a short inverse or minimum time characteristic. This short inverse time relay functions to assure that any smaller breakers nearer the fault trip first and any larger breakers further from the fault trip later than any given breaker in the series.

Under very heavy currents, however, which completely exceed the interrupting capacity of the next smaller circuit breaker in series following a given circuit breaker, even the quick trip time relay is by-passed, and the given circuit breaker opens instantaneously without any delay whatever. This provides for immediate protection not merely of the original load and circuit, but also of the circuit breakers which follow in series after the given circuit breaker. Also, the instantaneous feature may increase the rupturing capacity of the breaker to which it is attached.

Thus in the system shown in Figure 1, the circuit breaker 1, as will be obvious, requires no instantaneous trip, but the quick trip is useful in order to quickly clear a fault before damage occurs and to make it selective with breaker 2 beyond 6000 amperes. Thus following curve 1 for circuit breaker 1, the section $a$, as above described, shows the operation of the circuit breaker under overcurrents which permit the time delay to operate.

Circuit breaker 1 is normally a 100 ampere circuit breaker with time delay up to ten times normal current; after which a quick trip is provided having a very short inverse time delay. Circuit breaker 1 has maximum interrupting capacity of 15,000 amperes.

Thus, following curve 1, it will be seen that at an overcurrent value of a little more than 200 amperes, it will take more than 100 seconds for the circuit breaker to trip. At an overcurrent, however, of 700 amperes, the circuit breaker will trip, should this overcurrent continue for only 10 seconds. At an overcurrent value of 900 amperes, the circuit breaker will trip, should this overcurrent continue for only 8 seconds. However, should the overcurrent value be 1000 amperes, or 10 times the normal rating, then the quick trip comes into play, as shown at curve *b* or *c*, and the circuit breaker will trip within .05 second or substantially three cycles.

At greater overcurrent values, the tripping operation will even be faster, as for example at 4,000 amperes in which case tripping occurs in .016 second or substantially one cycle.

At any of these values, breaker No. 1 has sufficient capacity to open the circuit. Accordingly, as shown by portion *c* of curve 2, circuit breaker No. 2 will not open due to the time delay which sufficiently delays the opening of the circuit breaker No. 2 so that circuit breaker No. 1 opens the circuit and renders the overload device of circuit breaker No. 2 ineffective before it can trip its circuit breaker. Thus, for example, at 4000 amperes, circuit breaker No. 1 opens in .016 second but circuit breaker No. 3 would take 10 seconds to open or 600 cycles.

However, at 15,000 amperes, as above pointed out, the interrupting capacity of circuit breaker 1 is exceeded, and it is necessary that the next circuit breaker open instantaneously. Consequently, the next circuit breaker 2 is provided with an instantaneous trip which comes into operation at 15,000 amperes. This point is indicated at portion *d* of curve 2.

The other elements of curve 2 correspond in operation to the previously mentioned elements of curve 1. However, it will be seen that even a quick trip operation *b* of curve 2 occurs with some small time delay over portion *c*, roughly, of the order of .15 second between *c'* and *c"*.

The instantaneous trip at 15,000 amperes is arranged, however, so that even the quick trip time delay is overcome, and the circuit breaker opens in .016 second, and thus in less than a single cycle to protect circuit breaker 1.

Again, circuit breaker 2 has, as shown on drawing, a maximum interrupting capacity of 25,000 amperes. Consequently, it is necessary that circuit breaker 3 become instantaneous at this point.

Circuit breaker 3, as shown by curve 3, has an ordinary time delay for ordinary overcurrent surges, a quick trip, and a time delay on the quick trip, as above pointed out in connection with curves 1 and 2. Circuit breaker 3 also has an instantaneous trip *d* which comes into operation at 25,000 amperes to by-pass even the quick trip time delay and to make the operation of circuit breaker 3 instantaneous at 25,000 amperes, so that it too trips in about .016 second at this current value.

Similarly, since circuit breaker 3 has a maximum interrupting capacity of 50,000 amperes, circuit breaker 4 is arranged to be instantaneous at this value, as will be obvious from the graph of Figure 1; and thus circuit breaker 4 is instantaneous at any value from 50,000 to 75,000 amperes. The 75,000 amperes maximum interrupting capacity of circuit breaker 4 is designed to be greater than any possible current intensity which may occur in the entire distribution system.

One form of such combination time delay-quick-trip instantaneous device is shown in Figures 3 to 6.

In these figures only the tripping armature and its associated elements are shown. It will be understood, of course, that the tripping armature structure here shown is part of a complete circuit breaker and that the various devices secured to said armature may, with only obvious adaptations, be secured to cooperate with any type of tripping mechanism of a circuit breaker.

It must be understood that the minute time delay achieved in connection with the quick trip device must be a time delay which is of the very shortest duration possible which will serve to momentarily halt the armature, such as momentarily delaying the motion of the armature, to afford an opportunity for another circuit breaker to clear the overcurrent or short-circuit condition. If this relatively minute time delay is of too great a duration, then the circuit breaker does not fully protect the line and the load between which it is connected. If the time delay is too short, then the circuit breaker may be unnecessarily brought into operation. The time delay period selected, therefore, must be just that time period which is necessary to afford the next succeeding subsidiary circuit breaker time to clear the default. This time delay should not be of any greater duration.

Obviously of course, as above pointed out, should the fault condition be such that the next succeeding subsidiary circuit breaker could not possibly clear the fault, then even this minute time delay should be removed. For this purpose the time delay on the quick trip device contemplated by this invention requires reliable operation at short periods of time, such as 1 to 12 cycles.

In Figure 3 the various parts of the time delay device are shown in the at-rest or de-energized position where no fault of any kind has occurred and where only normal current is flowing with no surges of any kind. The tripping device 20 is enclosed in any suitable housing 21 which may be secured in any appropriate manner to a circuit breaker panel or housing. The tripping magnet 22 (which is ordinarily energized by a series coil) is secured in appropriate position with respect to the housing in any suitable manner, as for instance by the angle brackets 23 and 24 which in turn are secured to the housing 21 by the bolts 25 and 26.

The tripping armature 30 is rotatably mounted on the pin 31 which in turn is secured between side plates of the housing. Armature 30 is provided at one end thereof with a plate 32 of a suitable magnetizable material which may readily be attracted by the magnet 22 on the occurrence of pre-determined fault conditions. The armature 30 is provided with an adjustable abutment 35 which bears against the undersurface 36 of the latch tripping member 37. Latch tripping member 37 is likewise rotatably mounted on the pin 31 and at its opposite end is provided with a roller 38 held in position in any suitable manner, as for instance by the cotter pin 39, which roller (as is shown in Figure 6) may be brought into engagement with the latch mechanism 40 of the circuit breaker itself in order to rotate this latch mechanism for the purpose of tripping the circuit breaker open.

Any suitable means (not shown) may be provided to retain the tripping member 37 in the normal position shown in Figure 3. Such means are commonly known and used in the art and may for instance, comprise a coil spring (not shown) surrounding the pin 31 and bearing against the right hand surface of the tripping member 37. The abutment 35 is adjustable, as above pointed out, by reason of the fact that it constitutes the head of a bolt 42 which is threaded through the suitable tapped openings 43 in the armature 30 and which may be adjusted by means of the slot 44. It is held in the proper adjusted position by the lock nut 45.

The armature 30 has secured thereto (in the manner hereinafter described) in any suitable manner a quick trip lever 50 which (in all cases except for the instantaneous trip) rotates with the armature 30 as it rises and falls. The quick trip lever 50 is itself rotatably mounted on the pin 31 and is secured to the armature 30 in such manner that for all purposes it is substantially a part thereof—except that when the instantaneous trip point is reached, as hereinafter described, the armature 30 may be freed from the quick trip lever 50. This manner of securement will be more specifically described in connection with the description of the operation of the tripping device at and above the instantaneous trip point.

The quick trip lever 50 cooperates with the elements hereinafter described to afford the minute time delay previously pointed out. Since this quick trip lever is itself intended to engage the momentum absorbing device or weight without affecting the armature setting itself, the quick trip lever is not intended to have any specific weight of its own. In other words, the quick trip lever 50 serves as a means for transmitting the driving force of the armature to a momentum absorbing weight and in an ideal situation trip lever 50 would itself be substantially weightless so that only the momentum of the armature need be considered. This is important for the reason that the calibration of the circuit breaker depends on the mass and space relationship between the armature 30 itself and the magnet 22. An additional weight on the armature itself may well make this calibration difficult.

In order, therefore, to attain this substantially weightless condition of the quick trip lever 50, a coil spring 52 is provided which surrounds the bushing 53 on the pin 31. One end 55 of the coil spring bears against the inside wall of the housing 21 and the other end 56 of the coil spring 52 bears against the right hand surface of the quick trip lever 50.

The coil spring 52 is thus arranged so that it will substantially counterbalance the weight of the quick trip lever 50 so that the quick trip lever 50 will not itself act as a drag upon the armature 30 while the quick trip lever will nevertheless be able to transmit the momentum of the armature 30 to the momentum absorbing device.

The momentum absorbing device comprises a mass 60 which is rotatably mounted on the shaft 61. A spur gear 62 is also rotatably mounted on a shaft 61 alongside the mass 60. The gear teeth 63 in the quick trip lever 50 always mesh with the teeth of the spur gear 62. Consequently any movement of the quick trip lever 50 will result in corresponding rotation of the spur gear 62.

A pawl 65 is rotatably mounted on a stud 66 on the mass 60. The end of the pawl 65 is biased inwardly toward the center 61 in any suitable manner as for instance by the coil spring 68. A ratchet 69 is provided on the spur gear 62 alongside the gear teeth of the spur gear 62. It will be clear that this ratchet is so arranged that any upward movement of the quick trip lever 50 of Figure 3 which thus results in a counterclockwise rotation of the spur gear 62 will, through the ratchet 69 and the pawl 65, result in a similar counterclockwise rotation of the mass 60.

Immediately upon the removal of the overcurrent condition which resulted in a rise of the armature 30 and the quick trip lever 50, the quick trip lever and armature may fall back under the influence of the springs hereinafter described, without any interference from the mass 60. This is so because, on the clockwise rotation of the light spur gear 62, there is then no driving connection between the spur gear 62 and the mass 60 owing to the pawl and ratchet arrangement above described.

By means of the pawl and ratchet arrangement, a quick re-set of the armature is thus provided in the event that the quick trip time delay has been sufficient to enable another circuit breaker to clear the fault. The mass 60 which has thus absorbed the momentum of the armature 30 during the rise of the armature will therefore, because of the pawl and ratchet arrangement, not be effective to prevent the quick re-set. The time delay is thus achieved by reason of the fact that the initial momentum of the armature is transmitted directly to the mass 60 which must in turn be brought into motion.

After the mass 60 begins to rotate, then if the armature is still subject to the initial attraction of the magnet 22 (that is, if the fault has not by that time been cleared) then the armature continues to move upwardly continuing to rotate the mass 60 and trips the circuit interrupter. The time delay which is thus obtained in bringing the mass 60 into movement is of the order of 1 to 12 cycles. In that period of time any subsidiary circuit breaker which is able to clear the load should have cleared the load so that the magnetic force on the armature exerted by the magnet should have been relaxed.

If the overload is not cleared in that short period of time, then the magnet is still effective to attract the armature to complete the tripping operation.

This quick trip time delay device, is, of course, intended to operate only when the circuit conditions are such that the original time delay device has been nullified. In other words, referring back once more to Figure 2, and taking for instance circuit breaker 2 in that chart, the original time delay which has not thus far been described, is effective from 900 amperes to just short of 1600 amperes to effect the necessary time delay to avoid false tripping on normal surges. The quick trip setting is effective at 1600 amperes—that is, at 1600 amperes the original time delay is nullified, the circuit breaker tripping device operates as if there were no original time delay, and the quick trip relatively minute time delay which has just been described comes into operation. Subsequently, at 20,000 amperes the instantaneous setting is reached where even the quick trip relatively minute time delay is nullified.

The ordinary time delay which prevents false tripping on normal surges will be described first. This ordinary time delay comprises the dashpot 75, in which the sucker disc 76 connected to the armature in a manner hereinafter described engages the disc 77 at the base of the dashpot. The overload device does not permit movement of the armature so that the setting of the armature is not affected by overloads until the sucker disc releases. Thus after overload conditions the current may drop to 100% and the armature will not continue its travel to trip. The short time device is restrained at the first part of the stroke and releases from restraint at the last part of the stroke. It will also reset if the current drops to 100%.

The operation of the dashpot 75 which affords a time delay by reason of the fact that discs 76 and 77 cannot be separated until the oil film between them is broken, is well understood and requires no further description. The upper disc 76 is connected by means of an extension 80 and a pin 81 to the vertical sleeve 82. Rod 83 is slidably mounted in the sleeve 82 and extends through an opening in the top cover plate 84 of the sleeve 82 and is connected in any suitable manner to the pin 85 on the armature 30. A compression spring 86 is mounted between an adjusting washer 87 on the rod 83 and the underside of the top plate 84. The washer 87 may be vertically adjusted along the rod 83 to vary the compression of the compression spring 86 and once it is moved to the proper position may be maintained in a set position with respect to rod 83, by means of the set screw 88 which projects through a vertical slot 89 in the side of the sleeve 82.

A similarly adjustable washer 91 held in position by the set screw 92 may be provided on the rod 83 above the top plate 84 of the sleeve 82 to limit the downward movement of the rod 83 so as not to impose any additional counterclockwise rotative strain on the armature 30 and the quick trip lever 50.

The compression spring 86 is adjusted so that on normal surges it is substantially uncompressible. Thus for instance, referring again to circuit breaker 2 of Figure 2 the time delay setting begins to be effective at 900 amperes. At this point the discs 76 and 77 begin to separate and time delay is afforded by the time taken to break the oil film between discs 76 and 77. The force exerted on the armature 30 by the magnet at 900 amperes is not sufficient however to compress the spring 86. The spring 86 is adjusted however so that any force exerted by the magnet on the armature will not be sufficient to compress the spring 86 until the current value reaches or exceeds 1600 amperes. Accordingly, up to 1600 amperes the time delay device operates as if there were a single, solid bar connecting the armature with the sucker discs. Accordingly up to 1600 amperes the time delay is achieved only by the time taken to separate the sucker discs in the dashpot.

Figure 5:
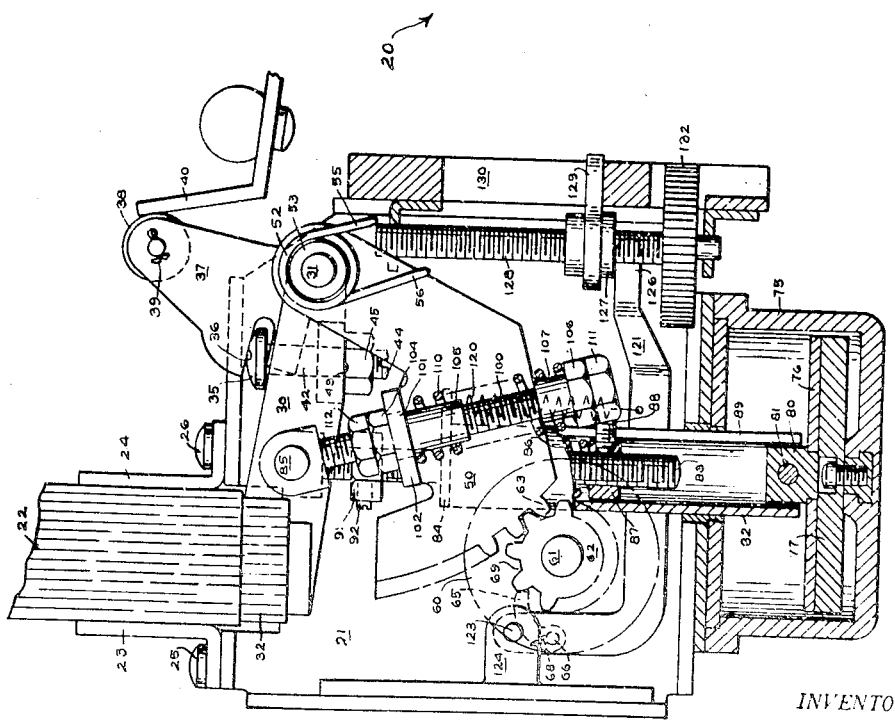
Figure 5 shows the position of the parts of the device of Figure 3 when the current is of sufficient value to bring the quick trip elements into play.

The compression spring 86, however, is so adjusted that at 1600 amperes the magnet 22 exerts sufficient force on the armature 30 to compress the spring 86. When such force is exerted which is thus sufficient to compress the spring 86, then the armature 30 rises even though the discs 76 and 77 stay together. The rod 83 is pulled up so that the washer 87 presses the spring 86 against the top plate 84 and the armature on such over-current conditions (in the example taken—1600 amperes or over) may thus rise toward the magnet as if the time delay dashpot 75 were not secured thereto, as illustrated in Figure 5. However, the spring tends to restore the armature to its original position if the current drops to 100% before the tripping motion is completed.

Accordingly, it is now seen how both the ordinary time delay and the quick trip time delay may be incorporated in a single unit. In the example taken (circuit breaker 2 of Figure 2) the time delay dashpot 75 is effective at any value from 900 amperes to 1600 amperes to slow the tripping operation so that normal current surges of short duration will not result in a tripping of the circuit breaker. At 1600 amperes the time delay dashpot 75 is in effect removed by reason of the fact that the spring 86 becomes compressible at that point. At that point, therefore, the quick trip time delay comes into operation. The armature 30 now moving up quickly and pulling up the quick trip lever 50 with it rotates the spur gear 62 and consequently rotates the mass 60. This operation results in the very short time delay, above described, and for the purposes above described.

It is obvious of course that the quick trip time delay element which includes the lever 50 and the mass 60 has no appreciable effect on the movement of the armature between 900 amperes and 1600 amperes (in the example taken—circuit breaker 2 of Figure 2). Here the rising of the armature under the time delay afforded by the separating of the discs 76 and 77 is relatively very slow and the mass 60 has no appreciable effect in slowing up this initially slow operation.

The quick trip as above pointed out comes into effect when the time delay 75 is mechanically shunted out by the compression of spring 86 and when the armature moves very quickly. The quick trip time delay acts in effect as a momentum absorber and timer to absorb the initial shock of movement of the armature 30 and thus effect a time delay of from 1 to 12 cycles. The quick trip time delay acts throughout the time delay period to delay the motion. If the magnet 22 continues energized sufficiently to attract the armature 30, the armature will nevertheless proceed with this delayed action through its course to effect a tripping operation.

Under certain conditions, as above described in connection with the discussion of Figures 1 and 2, it may be necessary even to obviate the relatively minute time delay afforded by the quick trip device so that a truly instantaneous trip is obtained. Accordingly the quick trip lever 50 is not directly and rigidly secured to the armature 30, but rather is so secured thereto that for all purposes up to the instantaneous trip point it operates with the armature while above the instantaneous trip point the armature is freed therefrom. For this purpose the means of connection between the quick trip lever 50 and the armature 30 comprises a threaded rod 100 which is pivotally secured in any suitable manner at one end to the pin 85. The opposite end of the rod 100 passes through an appropriate opening 101 in the cross-piece 102 on the quick trip lever 50 (the cross piece 102 may be simply secured to the upper surface of the quick trip lever 50 and extend normally thereto in order to provide for the opening 101; or in order to obtain a better balanced structure, two quick trip levers 50 may be used on either side of the armature 30 and connected together by the crosspiece 102).

The rod 100 is provided at its lower end with an adjustable nut 106 which carries a spring centering sleeve 107. Adjacent the other end of the rod 100 another adjustable nut 104 is provided which also carries a spring centering sleeve 105. The nut 104 is greater in diameter than the opening 101 in the bridging plate 102, while the sleeve 105 is smaller in diameter so that the said sleeve may readily pass therethrough. A compression spring 110 is captured between the upper surface of the adjusting nut 106 and the undersurface of the bridging plate 102, and is adjusted to the proper compression by appropriate rotation of the nuts 104 and 106.

When the proper compression of the spring 110 is obtained, then the nuts 104 and 106 are locked in position by the lock nuts 111 and 112. Compression spring 110 is so adjusted that for all current values up to the predetermined instantaneous trip point it is substantially incompressible; and thus for all current values up to that point the armature 30 and the quick trip lever 50 are essentially a single unit. Spring 110 is, however, so adjusted that at the instantaneous point, and above, the magnet 22 exerts sufficient force on the armature 30 to compress the spring 110.

Accordingly, above this instantaneous value the spring 110 may be compressed by the rise of the armature 30 so that the armature may operate free of the quick trip lever 50. Thus again referring to circuit breaker 2 of Figure 2, it is again pointed out that the time delay effected by the dashpot 75 is effective between 900 amperes and 1600 amperes. At 1600 amperes the spring 86 becomes compressible so that the dashpot 75 is mechanically shunted out. At 1600 amperes, however, the quick trip time delay becomes effective so that on rapid movement of the armature 30 the quick trip lever 50 brings the mass 60 into movement so that a relatively short time delay of 1 to 12 cycles is effected.

At 20,000 amperes which is the instantaneous trip point of breaker 2, Figure 2, the quick trip time delay is itself mechanically shunted out by reason of the fact that the spring 110 becomes compressible at that point. Accordingly the armature 30 may rise and if the quick trip lever 50 is even momentarily held back when the current is above 20,000 amperes the armature 30 may nevertheless rise although the quick trip lever is thus detained; and the armature 30 is thus freed from the quick trip lever by reason of the fact that the spring 110 is compressible as above pointed out.

As above pointed out, the spring 86 is adjustable so that different pick up settings for normal surges may be obtained. Likewise the spring 110 is adjustable so that different instantaneous trip points may be obtained. The armature itself is calibrated by means of the spring 120 which is attached at its upper end to an extension of the end plate 84 of sleeve 82 and at its lower end to the adjusting lever 121. That is, it will be obvious that the spring 120 need not necessarily be connected to spring 86, and since the compression spring 86 is substantially incompressible at current values below the quick trip point.

Accordingly, initial calibration of the armature 30 is achieved by means of the spring 120 so that for all current values up to the quick trip point the spring 120 may be relied on to maintain the predetermined calibration of the circuit breaker tripping device. The fact that the spring 120 is connected, however, to the end plate 84 of the sleeve 82 makes it possible also to mechanically shunt out the spring 120 when quick operation is desired. Thus, when the time delay afforded by the dashpot 75 is mechanically shunted out by the compression of spring 86, the calibrating spring 120 is at the same time mechanically shunted out and the operation of the armature thereafter depends upon the quick trip lever 50 and the mass 60 or in certain cases on the compressibility of the spring 110. Thus, for quick trip or instantaneous operation the possibly complicating factor of the calibrating spring 120 is removed from the necessary calculations. But as above pointed out, up to the point where the quick trip is intended to become effective by compression of spring 86, the spring 120 serves as a calibrating spring which is a factor in controlling the rise of the armature 30. Also, change in calibration of one spring does not effect the other calibration.

The adjusting lever 121 is an angular member as may be obvious from Figure 3, which at one end is mounted on the pin 123 carried by the lug 124 in the housing 21, and at the other end carries an extension 126 which bears against the undersurface of the adjusting nut 127. Adjusting nut 127 is in threaded engagement with the adjusting rod 128. The adjusting nut 127 has an indicator 129 which extends therefrom outwardly through the slot 130 in the housing 21. The adjusting rod 128 is provided at its lower end with a thumb screw 132 so that the adjusting rod 128 may be rotated. Rotation of rod 128 by means of the thumb screw 132 will result in a movement upward or downwardly of the adjusting nut 127. This is so because the adjusting nut cannot rotate by reason of the fact that its indicating extension 129 is engaged in the slot 130. The movement upward or downwardly of the adjusting nut 127 will result in a corresponding rise or fall of the end 126 of the adjusting lever 121 and in a consequent adjustment of the calibrating spring 120. A suitable scale may be placed on the outside of the housing adjacent the slot 130 and parallel to the path of travel of the indicating extension 129 to indicate the extent of adjustment.

As above pointed out, Figure 3 shows the relation of the parts in the de-energized position that is, when the circuit breaker is either open or when it is carrying only normal load, so that the calibrating spring 120 is sufficient by itself to prevent a rise of the armature 30.

Figure 4:
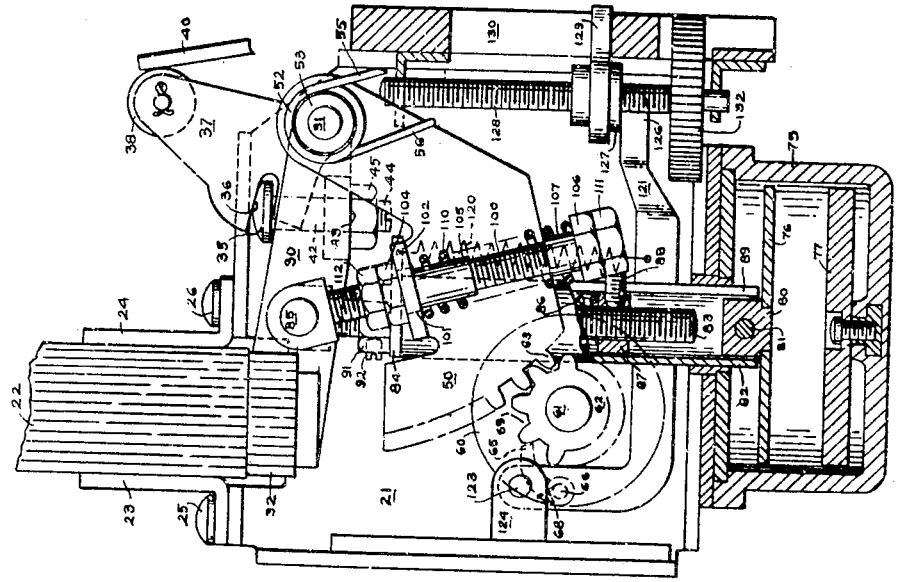
Figure 4 is a view corresponding to that of Figure 3 showing the position of the parts of the momentum absorbing device of Figure 3 after an overload has persisted long enough to break the film between the discs of the dashpot and the said discs have separated, allowing the armature to go to the closed gap position to trip the circuit breaker.

Figure 4 shows the relationship of all the parts after an overload has persisted long enough to break the film between the discs in the dashpot 75 and they have separated, allowing the armature to go to the closed gap position to trip the circuit breaker. As above pointed out, calibration of the time is secured by turning the dashpot in the usual manner. Calibration of the overload value is secured by changing the tension of the spring 120 as the indicating arm 129 is moved over the scale. The position of Figure 4 therefore, referring back once more to circuit breaker 2 of Figure 2, shows the condition where an overload between 900 amperes and 1600 amperes has persisted for a sufficiently long time to result in separation of the dashpot discs 76 and 77.

Figure 5 shows the position of all of the parts when the current is sufficiently valuable to mechanically shunt out the time delay dashpot 75 by compression of the spring 86 and thus to bring the quick trip into play. In this case the quick trip lever 50 has moved up with the armature. A time delay of short duration as above pointed out has been obtained by reason of the engagement of the gear teeth in the quick trip lever 50 with the spur gear 62 which in turn drives the mass 60. The pawl and ratchet arrangement above pointed out between the spur gear and the mass 60 provides for quick re-set if the overload is removed before the tripping position is reached.

Changing the momentum of the mass 60 changes the time setting.

The position shown in Figure 5 when related back to circuit breaker 2 of Figure 2 shows the condition of the circuit breaker when an overload occurs at current values between 1600 amperes and 20,000 amperes.

Figure 6 shows the position of the parts when there is a severe short circuit and substantially instantaneous trip is desired. In this case both the dashpot 75 and the quick trip momentary time delay are mechanically shunted out by the compression of spring 110. Again as above pointed out, only a very heavy short circuit current can cause the magnet 22 to exert sufficient force on the armature 30 to compress the spring 110. The position shown in Figure 6 when related to circuit breaker 2 of Figure 2 corresponds to a short circuit condition of over 20,000 amperes.

In the foregoing Figures 3 to 6, I have shown one physical embodiment of a combination time delay-quick trip-instantaneous trip circuit breaker tripping device which will be effective to carry out all of the principles set forth in connection with Figures 1 and 2.

As has been above emphasized, in order to obtain proper sequential cascading operation, each of the circuit breakers in the system should be provided with a time delay device to obviate false tripping on normal current surges of short duration with a means for obtaining a quick trip above such normal surges (for instance, at 10 times normal load) with means nevertheless for obtaining a very short time delay with the quick trip to prevent unnecessary tripping of circuit breakers; and with additional means to mechanically shunt out even the quick trip momentary time delay to obtain a truly instantaneous trip on very heavy short circuit currents.

The construction of the unit shown in Figures 3 to 6 accomplishes all of these functions and thus this unit may be used in the circuit breakers which have been discussed in connection with Figures 1 and 2. Many other arrangements for obtaining these results should of course now be obvious in view of the foregoing descriptions. In the following I have illustrated and described several preferred constructions which differ in some respects from the methods and means illustrated in connection with Figures 3 to 6.

In the foregoing I have described my invention and the method achieved thereby in connection only with specific preferred embodiments and in connection with specific operative examples of the system and the method. Many variations and modifications of the physical embodiment of my invention and of the systems and methods which are the essence thereof should now be obvious to those skilled in the art. Accordingly, I prefer to be bound not by the specific disclosures herein, but only by the appended claims.

I claim:

1. In a time delay mechanism for circuit breaker trip apparatus having an armature mounted for predetermined movement, and a magnet for applying variable forces for effecting movement of said armature in one direction; a first time delay member comprising a dashpot, a first connection between said first time delay member and the armature, said first connection having sufficient rigidity to maintain a rigid connection between said first time delay member and the armature when the force applied to the armature is less than a first predetermined force and said first connection having sufficient flexability to permit movement of the armature without a corresponding movement of said first time delay member when the force applied to the armature is at least said first predetermined force, a second time delay member comprising a rotatable mass, a shaft for said mass at its own center of mass on which said mass is rotatable, a second connection between said rotatable mass and the armature for rotating said mass about its shaft by the movement of the armature, said second connection having sufficient rigidity to maintain a rigid connection between said second time delay member and said armature when said armature is attracted with less than a second predetermined force and said second connection having sufficient flexibility to permit movement of said armature without corresponding movement of said second time delay member when said armature is attracted by said magnet with at least said second predetermined force, said second predetermined force being greater than said first force.

2. In a time delay mechanism for a circuit breaker having an armature mounted for predetermined movement in one direction in response to a variable force, said time delay mechanism for retarding movement of the armature in said direction including a first time delay member, a first connection between said first time delay member and said armature, said first connection having sufficient rigidity to maintain a rigid connection between said first time delay member and said armature when the armature is attracted with less than a predetermined force and said first connection having sufficient flexibility to permit movement of the armature without a corresponding movement of said first time delay member when the armature is attracted with at least said predetermined force, a second time delay member comprising a rotatable mass having a center of mass on which said mass is rotatable, a second connection between said rotatable mass and the armature, said second connection having sufficient rigidity to maintain a rigid connection between said second time delay member and said armature when said armature is attracted with less than a second predetermined force for rotating said mass on its center to delay movement of the armature, and said second connection having sufficient flexibility to permit movement of the armature without corresponding movement of said second time delay member when the armature is attracted with at least said second predetermined force, said second connection being a one-directional connection for permitting quick restoration of said armature to its original position when said force is removed without delay from said mass, said second predetermined force being greater than said first force.

3. In a time delay mechanism for a circuit breaker having an armature arranged for movement in response to variable forces applied thereto; said time delay mechanism comprising a first time delay member, a spring connection between said armature and said member, said spring providing a substantially rigid connection between said armature and member whereby movement of said armature is controllable by said member when less than a predetermined force is applied to the armature, said spring providing a flexible connection between said armature and member to permit movement of said armature without corresponding movement of said member when at least said predetermined force is applied to the armature, a rotatable mass having a center of mass on which said mass is rotatable, a spring connecting said mass to said armature, said spring providing a substantially rigid connection between said armature and said mass whereby movement of said armature is controlled by movement of said mass on its center when said armature is operated by less than a second predetermined force, said spring providing a flexible connection between said armature and said mass to permit movement of said armature without corresponding movement of said mass when at least said second predetermined force is applied to the armature, said second predetermined force being greater than said first force.

4. In a time delay mechanism for a circuit breaker having an armature mounted for predetermined movement in one direction in response to variable forces; a spring connected at one end to said armature and fixed at the other end to bias said armature against movement, and mechanism for retarding movement of said armature in said direction including a first time delay member, a first connection between said first time delay member and said armature, said first connection having sufficient rigidity to maintain a rigid connection between said first time delay member and said armature when said armature is attracted with less than a first predetermined force and said first connection having sufficient flexibility to permit movement of said armature without a corresponding movement of said first time delay member when said armature is attracted with at least said predetermined force, a second time delay member, a second connection between said second time delay member and said armature, said second connection having sufficient rigidity to maintain a rigid connection between said second time delay member and said armature when said armature is attracted with less than a second predetermined force and said second connection having sufficient flexibility to permit movement of said armature without corresponding movement of said second time delay member when said armature is attracted with at least said second predetermined force, said second predetermined force being greater than said first force.

5. In a time delay mechanism for a circuit breaker having an armature arranged for movement in one direction in response to a variable force; said mechanism comprising an oil dashpot, means including a spring connecting said dashpot to said armature, said spring providing a substantially rigid connection between said armature and dashpot whereby movement of said armature is controllable by said dashpot when less than a pretermined force is applied to the armature, said spring providing a flexible connection between said armature and said dashpot to permit movement of said armature without corresponding movement of said dashpot when at least said predetermined force is applied to the armature, a mass, a spring connecting said mass to said armature, said spring providing a substantially rigid connection between said armature and said mass whereby movement of said armature is controlled by said mass when less than a second predetermined force is applied to the armature, said spring providing a flexible connection between said armature and said mass to permit movement of said armature without corresponding movement of said mass when at least said second mentioned predetermined force is applied to the armature, said second predetermined force being greater than said first force.

6. In a time delay mechanism for circuit breaker trip apparatus having an armature mounted for predetermined movement in one direction in response to variable forces; said mechanism for retarding movement of said armature in said one direction including a first time delay member, a spring connection from said first time delay to said armature, said spring being a substantially rigid connection between said first time delay member and armature when less than a first predetermined force is applied to the armature and being flexibly connected for permitting movement of said armature without corresponding movement of said time delay member when at least said first predetermined force is applied to the armature, a second time delay member comprising a mass and a spring connection from said second time delay member to said armature, said spring being a substantially rigid connection between said second time delay member and armature when less than a second predetermined force is applied to the armature and being a flexible connection for permitting movement of said armature without corresponding movement of said second time delay member when at least said second predetermined force is applied to the armature, said second predetermined force being greater than said first force.

7. In a time delay mechanism for a circuit breaker having trip apparatus and an armature mounted for predetermined movement in one direction in response to variable forces, a first time delay member for retarding movement of said armature in said one direction in response to currents up to twelve times the normal current flowing in the circuit protected by said circuit breaker, a spring connection from said first time delay member to said armature, said spring being a substantially rigid connection between said first time delay member and armature when less than a first predetermined force is applied to said armature for moving it in said one direction and said spring being a flexible connection for permitting movement of said armature without corresponding movement of said time delay member when at least said first predetermined force is applied to the armature for moving it in said one direction, a second time delay member for delaying the movement of said armature in response to currents between twelve times and the interrupting capacity of the circuit breaker flowing in the line protected by the circuit breaker, said second time delay member comprising a mass having a center of mass on which said mass is rotatable, and a second connection from said rotatable mass to said armature for rotating said mass about its center of mass by the movement of said armature when said armature is attracted in said one direction by a second predetermined force.

8. In a time delay mechanism for circuit breaker trip apparatus having an armature mounted for predetermined movement, and a magnet for applying variable forces for effecting movement of said armature in one direction; a time delay mechanism for retarding movement of the armature in said direction including a first time delay member comprising a dashpot, a first connection between said first time delay member and the armature, said first connection having sufficient rigidity to maintain a rigid connection between said first time delay member and the armature when the force applied to the armature is less than a first predetermined force and said first connection having sufficient flexibility to permit movement of the armature without a corresponding movement of said first time delay member when the force applied to the armature is at least said first predetermined force, a second time delay member comprising a rotatable mass, a shaft for said mass at its own center of mass on which said mass is rotatable, a second connection between said rotatable mass and the armature for rotating said mass about its shaft by the movement of the armature, said second connection having sufficient rigidity to maintain a rigid connection between said second time delay member and the armature when the force applied to the armature is less than a second predetermined force greater than the first-mentioned force and said second connection being flexible when the force applied is at least as great as said second predetermined force.

9. In a time delay mechanism for a circuit breaker having an armature mounted for predetermined movement in one direction in response to a variable force, said time delay mechanism for retarding movement of the armature in said direction including a first time delay member, a first connection between said first time delay member and said armature, said first connection having sufficient rigidity to maintain a rigid connection between said first time delay member and said armature when the armature is attracted with less than a predetermined force and said first connection having sufficient flexibility to permit movement of the armature without a corresponding movement of said first time delay member when the armature is attracted with at least said predetermined force, a second time delay member comprising a rotatable mass having a center of mass on which said mass is rotatable, means including a second connection between said rotatable mass and the armature, said second connection being a one-directional connection for permitting quick restoration of said armature to its original position when said force is removed without delay from said mass, said second connection having sufficient rigidity to maintain a rigid connection between said second time delay member and the armature when the force applied to the armature is less than a second predetermined force greater than the first-mentioned force and said second connection being flexible when the force applied is at least as great as said second predetermined force.

10. In a time delay mechanism for circuit breaker trip apparatus having an armature mounted for predetermined movement in one direction in response to a variable force for engaging said trip apparatus, said time delay mechanism for retarding movement of the armature in said direction including a first time delay member, a first connection between said first time delay member, and said armature, said first connection having sufficient rigidity to maintain a rigid connection between said first time delay member and said armature when the armature is attracted with less than a predetermined force corresponding to overload currents, said first connection having sufficient flexibility to permit movement of the armature without a corresponding movement of said first time delay member when the armature is attracted with at least said predetermined force, and a second time delay mechanism comprising a rotatable mass, a shaft for said mass at its own center of mass on which said mass is rotatable, and a connection from said mass to said armature for rotating said mass about its center of mass by the movement of said armature, said second time delay mechanism delaying the operation of said armature when the armature is attracted by a force corresponding to fault currents over a range of the order of ten times normal and up to the short circuit interrupting capacity of the circuit breaker, the time delay operation of said second time delay being of the order of cycles in a sixty cycle system and the time delay of the first time delay member being of the order of seconds.

HERBERT C. GRAVES, Jr.

REFERENCES CITED

The following references are of record in the file of this patent:

UNITED STATES PATENTS

| Number | Name | Date |
| --- | --- | --- |
| 1,123,288 | Hellmund | Jan. 5, 1915 |
| 1,176,634 | Aichelle | Mar. 21, 1916 |
| 1,216,570 | Hohn | Feb. 20, 1917 |
| 1,250,746 | Wolff | Dec. 18, 1917 |
| 1,278,189 | Marshall | Sept. 10, 1918 |
| 1,425,700 | Scott | Aug. 15, 1922 |
| 1,496,744 | Ruddick | June 3, 1924 |
| 2,088,174 | Paullin | July 27, 1937 |
| 2,340,973 | May | Feb. 8, 1944 |
| 2,352,119 | Putt | June 20, 1944 |
| 2,357,959 | Kouyoumjian | Sept. 12, 1944 |
| 2,393,736 | Bennet et al | Jan. 29, 1946 |
| 2,419,892 | Graves | Apr. 29, 1947 |
| 2,439,165 | Graves, Jr. | Apr. 6, 1948 |